(12) United States Patent
Heitmann et al.

(10) Patent No.: US 7,364,523 B2
(45) Date of Patent: Apr. 29, 2008

(54) TRANSMISSION

(75) Inventors: Axel Heitmann, Ingolstadt (DE); Stefan Kilian, Friedrichshafen (DE); Oliver Steffen, Coburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 176 days.

(21) Appl. No.: 11/327,893

(22) Filed: Jan. 9, 2006

(65) Prior Publication Data

US 2006/0194665 A1 Aug. 31, 2006

(30) Foreign Application Priority Data

Jan. 13, 2005 (DE) .................. 10 2005 001 527

(51) Int. Cl.
*F16H 3/72* (2006.01)
(52) U.S. Cl. ...................................... 475/5
(58) Field of Classification Search ............ 475/5; 180/65.7; 903/911
See application file for complete search history.

(56) References Cited

U.S. PATENT DOCUMENTS 5,558,175 A 9/1996 Sherman 6,966,860 B2 11/2005 Heitmann et al.

FOREIGN PATENT DOCUMENTS

| DE | 196 06 771 A1 | 8/1997 |
| DE | 695 10 897 T2 | 11/1999 |
| DE | 101 40 424 A1 | 2/2003 |

*Primary Examiner*—Dirk Wright
(74) *Attorney, Agent, or Firm*—Davis Bujold & Daniels, P.L.L.C.

(57) ABSTRACT

A transmission (1) comprises a gear input shaft (2), a gear output shaft (3), several shift elements (7, 8, 9, 10, 11, 12, 13, 19), at least one planetary gearset (5) and an electrical machine (14). A required gear ratio can be adjusted as a function of the activation of the shift elements (7 to 13, 19) and the electrical machine (14). The electrical machine (14) can be linked to a first shaft (21) of the first planetary gearset (5) by way of a first shift element (12) and to a second shaft (18) of the first planetary gearset (5) by way of a second shift element (13). At least the first shift element (12) or the second shift element (13) is disposed in the axial direction of the gear input shaft (2) adjacent to the electrical machine (14).

10 Claims, 3 Drawing Sheets

TRANSMISSION

This application claims priority from German Application Ser. No. 10 2005 001 527.1 filed Jan. 13, 2005.

FIELD OF THE INVENTION

The invention relates to a transmission.

BACKGROUND OF THE INVENTION

DE 101 40 424 A1 discloses a transmission of this kind, or an automatic vehicle transmission, which is provided with a gear input shaft, which in turn, can be connected to a drive shaft of an internal combustion engine of a motor vehicle. Furthermore, the vehicle transmission comprises a gear output shaft, which can be linked with at least one vehicle axle. A part of the transmission configured as a manually shifted transmission is provided with a first planetary gearset and a second planetary gearset, several shift elements and an electrical machine, which is used as a starter/generator and/or for continuously adjusting the speed ratio of the manually shifted transmission and/or for an at least partial electrical operation of a vehicle. For this, the electrical machine can be linked with a first shaft or a second shaft of the first planetary gearset by means of two additional shift elements.

It is disadvantageous that the two additional shift elements and the electrical machine are disposed coaxially to the drive shaft such that the shift elements are positioned radially between the electrical machine and the input shaft. Due to the limited installation space that is available for the vehicle transmission in the vehicle, the maximum efficiency of the electrical machine and the maximum available transmission capabilities of the additional shift elements disposed inside the electrical machine are limited undesirably.

It is, therefore, the object of the present invention to provide a transmission, which offers a more efficient electrical machine as well as shift elements with greater transmission capabilities in the area of the electrical machine than is the case with the vehicle transmission known from the prior art—without increasing the need for installation space of the transmission in the radial direction compared to a vehicle transmission known from the state of the art.

SUMMARY OF THE INVENTION

The transmission, according to the invention, comprises a gear input shaft, a gear output shaft, several shift elements, at least two planetary gearsets and an electrical machine, wherein a required gear ratio in the transmission can be adjusted as a function of the activation of the shift elements and the electrical machine and wherein the electrical machine can be linked to a first shaft of the first planetary gearset by way of a first shift element and to a second shaft of the first planetary gearset by way of a second shift element, advantageously offers the possibility of designing the electrical machine with greater efficiency compared to a vehicle transmission known from the prior art and of configuring the first shift element and the second shift element to have greater transmission capabilities compared to a conventional vehicle transmission, respectively, without raising the need for installation space of the transmission in the radial direction significantly.

This is accomplished in that at least the first shift element or at least the second shift element is disposed in the axial direction of the gear input shaft adjacent to the electrical machine. As a result of the arrangement of at least the first shift element or at least the second shift element according to the invention, additional space is available between the gear input shaft and the electrical machine for the dimensioning of the electrical machine compared to a vehicle transmission known from practice, even if only the first shift element or only the second shift element is moved out of the area between the electrical machine and the gear input shaft and in the axial direction of the gear input shaft adjacent to the electrical machine since the space required previously by the shift element, which is now disposed outside the radial area enclosed by the electrical machine, is now available for the shift element remaining inside the radial area of the electrical machine and also for the electrical machine.

BRIEF DESCRIPTION OF THE DRAWINGS

The invention will now be described, by way of example, with reference to the accompanying drawings in which the equivalent reference numerals are used for components that are identical in design and function in the various examples of the specification. The drawings shows.

DETAILED DESCRIPTION OF THE INVENTION

Figure 1:
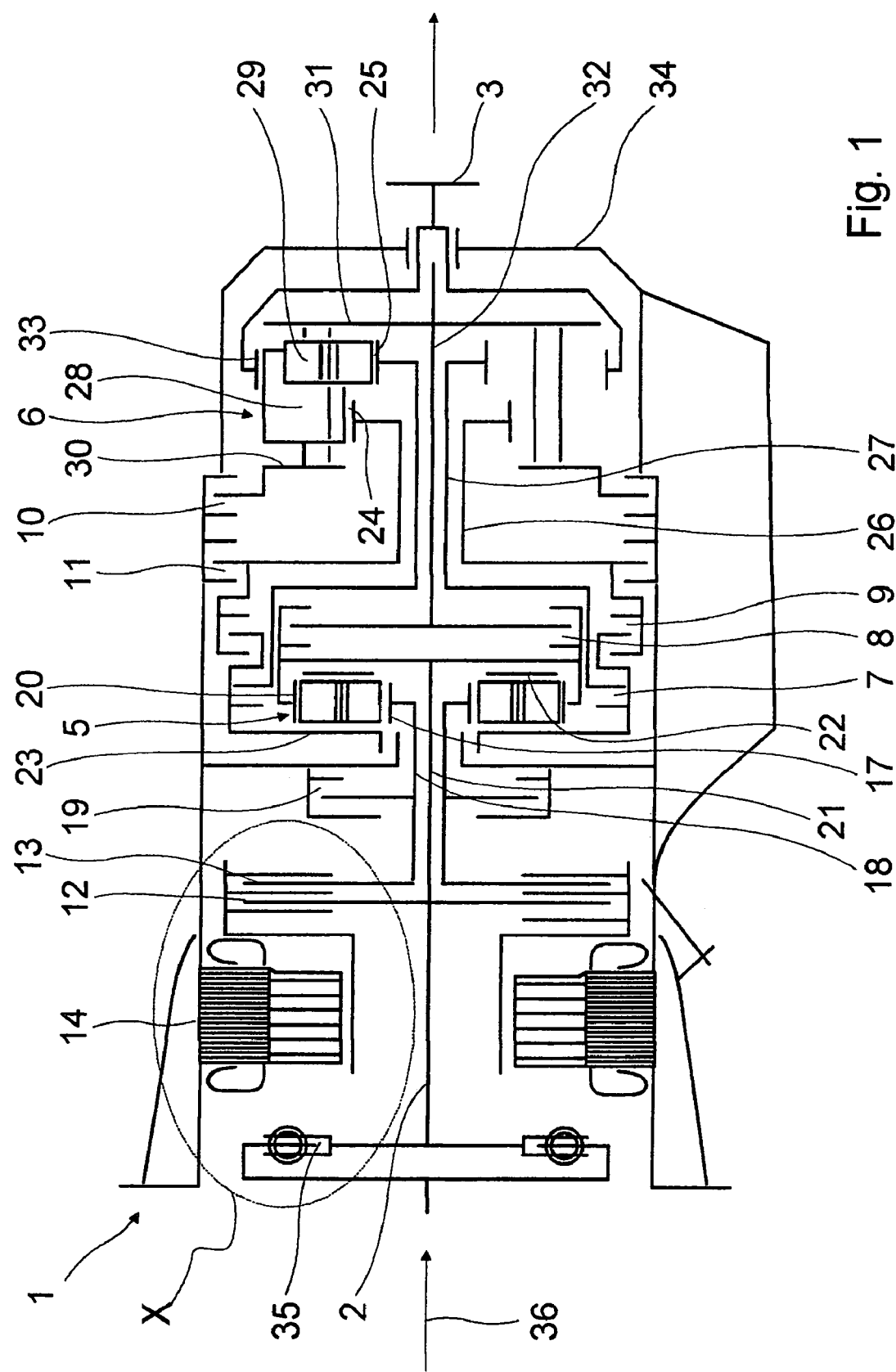
FIG. 1 is a gear diagram of a transmission configured according to the invention.

FIG. 1 illustrates a gear diagram of an automatic transmission 1 for vehicles, in particular for motor vehicles, in a schematic view. The transmission 1 comprises among other things a gear input shaft 2, which is mechanically linked on the input side to a torsional vibration damper 35, with an engine output shaft 36 being provided on the side of the torsional vibration damper 35 that faces away from the gear input shaft 2 so that the gear input shaft 2 is mechanically linked to the engine. output shaft 36 via the torsional vibration damper 35. On the output side, the transmission 1 comprises a gear output shaft 3, which in the mounted state of the transmission 1, is linked to at least one vehicle axle of a vehicle.

Several shift elements 7, 8, 9, 10, 11, 12, 13 and 19, a first planetary gearset 5, a second planetary gearset 6 and electrical machine 14 are provided between the gear input shaft 2 and the gear output shaft 3. The first planetary gearset 5 which, in the present case, is configured as a simple planetary gearset, is arranged upstream from the second planetary gearset 6, which is configured as a Ravigneaux-type planetary gearset.

Using the transmission concept illustrated by way of example in FIG. 1, for example, a multi-ratio automatic transmission of a motor vehicle comprising six forward gears and one reverse gear can be implemented with an overall gear ratio of the transmission 1 required as a function of the present operating mode of a transmission control unit or an overall gear ratio of the transmission 1 required by the driver being adjusted as a function of the activation of the shift elements 7 to 13 and 19 as well as the electrical machine 14.

Of course, at the discretion of the person skilled in the art, the transmission 1 may be configured differently from the way illustrated in FIG. 1 in the area between the first planetary gearset 5 and the gear output so as to be able to implement various gear ratios in steps or in a continuously variable manner. Moreover, it is also conceivable to design the transmission without the torsional vibration damper.

A sun gear 17 of the first planetary gearset 5 is connected to the shift element 19 configured as a brake via a sun gear shaft 18 so that a vehicle comprising the transmission 1 can be started to drive without the use of a hydrodynamic torque converter. The electrical machine 14 in the present case is configured as a starter and generator device, which is associated with an electronic control system (not illustrated in detail) and with a storage battery. Integrating the electrical machine in the transmission 1 offers the possibility of starting to drive a vehicle equipped with the transmission 1 from the "geared neutral" operating mode.

Between the electrical machine 14 and the first planetary gearset 5 in the axial direction of the gear input shaft 2, the first shift element 12 configured as a clutch and the second shift element 13, likewise configured as a clutch, are provided by way of which the electrical machine 14 in the closed state can be mechanically linked to a ring gear 20 or the sun gear shaft 18 of the first planetary gearset 5, respectively.

In the present case, for example, the second shift element 13 is engaged and a starter torque applied by the electrical machine 14 is supplied to the first planetary gearset 5 via the sun gear shaft 18 for starting an internal combustion engine that is mechanically linked to the gear input shaft 2. This increases the starter torque of the electrical machine 14, which is transmitted to the gear input shaft 2 and from there to the crankshaft of the internal combustion engine.

While driving, as a result of a speed-variable engagement of the electrical machine 14 with the sun gear shaft 18, it is possible to select not only seven forward gears with fixed gear ratios, but also five forward drive ranges with continuously variable gear ratios. Moreover, this advantageously offers the possibility of performing an energy recuperation step via the electrical machine 14 while driving, in particular while braking, and of storing the electric energy, which is generated by the electrical machine operated as a generator, in the energy storage device (not illustrated in detail) and is connected to the electrical machine 14.

Additionally, using a vehicle that comprises the transmission 1 according to the invention, it is possible to operate the vehicle with zero emission in the electric mode both in the forward drive mode and the reverse drive mode, for example, when maneuvering it in the city center.

The arrangement of the first shift element 12 and the second shift element 13, illustrated in FIG. 1, offers the possibility of linking the electrical machine 14 to the gear input shaft 2 by way of the first shift element 12 after starting the internal combustion engine. The gear input shaft 2 is then linked directly to the engine output shaft 36 of the internal combustion engine.

This operating mode of the transmission 1 advantageously offers the opportunity of providing the driver upon request with increased torque, which is generated by the internal combustion engine so that a boost operating is possible. Additionally, such interconnection of the components in the transmission 1 supplies the electronic on-board network permanently with power during the generator operating mode of the electrical machine 14. If the first shift element 12 and the second shift element 13 are engaged simultaneously, the first planetary gearset 5 is blocked so that by combining the first planetary gearset 5 with the second planetary gearset 6, two additional forward gears and one additional reserve gear can be shifted.

The ring gear 20 of the first planetary gearset 5 is permanently linked to the gear input shaft 2 via a ring gear shaft 21. Planetary gears 22 of the first planetary gearset are connected to a planet carrier 23 which, in turn, can be linked to the second planetary gearset by way of the shift elements 7, 8 and 9 or can be blocked with a housing 34 of the transmission 1 by way of the shift element 11 configured as a brake.

The second planetary gearset 6 comprises substantially a first sun gear 24 and a second sun gear 25, which can be linked to the first planetary gearset 5 by way of a first sun gear shaft 26 as well as a second sun gear shaft 27 or can be blocked with the housing 34 by way of the brake 11. A set of first planetary gears 28 is mounted on a first planet carrier 30 of the second planetary gearset 6, which can be blocked with the housing 34 by way of the brake 10. The first planetary gears 28 as well as the second planetary gears 29 can be linked to the first planetary gearset 5 by way of a second planet carrier 31 and an intermediate shaft 32. A ring gear 33 of the second planetary gearset 6 is linked directly to the gear output shaft 3 of the transmission 1.

In FIG. 2 to FIG. 8, the area marked X in FIG. 1 is shown in diagrammatic individual views of various examples of the transmission 1, the different embodiments differing substantially in the arrangement of the first shift element and the second shift element in relation to the electrical machine 14.

Figure 2:
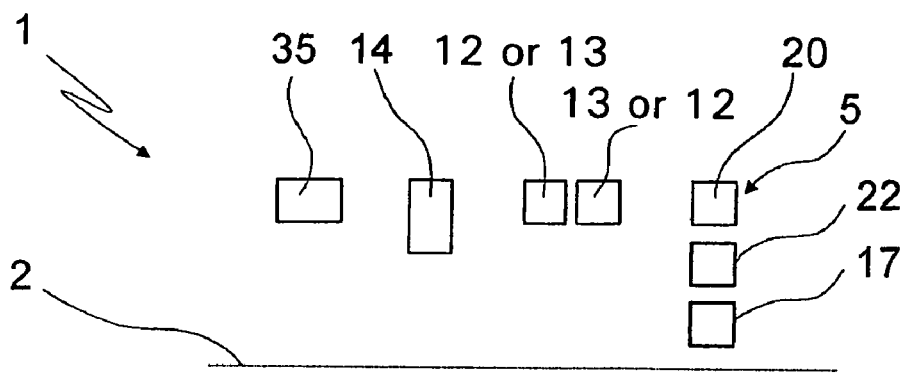
FIG. 2 is the area X marked in FIG. 1 in a schematic illustration.

With respect to the electrical machine 14, the arrangement of the first shift element 12 and the second shift element 13, illustrated in FIG. 2, corresponds to the transmission 1 shown in FIG. 1, in which the two shift elements 12 and 13 are disposed at the gear input side on the side of the electrical machine 14 that faces away from the torsional vibration damper 35 or away from the gear input in the axial direction of the gear input shaft 2 adjacent to the electrical machine 14, i.e., between the electrical machine 14 and the first planetary gearset 5 and also adjacent to each other in the radial direction.

Hence, compared to the vehicle transmission disclosed in DE 101 40 424 A1, the shift elements 12 and 13 are moved out of the radial area between the electrical machine 14 and the gear input shaft 2 adjacent to the electrical machine 14 so that the previously required installation space between the electrical machine 14 and the gear input shaft 2 for the arrangement of the first shift element 12 and the second shift element 13 is now available for the electrical machine 14. With the transmission 1 according to the invention from FIG. 1, this way an electrical machine 14 having greater efficiency can be implemented, without requiring significant changes to the dimensions of the housing 34 of the transmission 1 in the radial direction compared to the vehicle transmission known from the state of the art.

Moreover, both the first shift element 12 and the second shift element 13, which are disposed in the axial direction of the gear input shaft 2 adjacent to each other between the electrical machine 14 and the first planetary gearset 5, can be configured with larger outer diameters than those in the vehicle transmission known from the prior art. As a result, the transmission capabilities that are required for operating the transmission 1 can be achieved while, at the same time, keeping the installation space requirement of the two shift elements 12 and 13 in the axial direction low, since with a configuration of the shift elements 12 and 13 as multi-disk clutches fewer disks are required to achieve the same transmission capability due to the larger outer diameter.

Additionally, when configuring the first shift element 12 and the second shift element 13 as wet clutches, there is the possibility of separating the wet segment of the transmission from the dry segment of the transmission 1 easily in the area between the electrical machine 14 and the two shift elements 12 and 13. This way, the two shift elements 12 and 13, as well as the remaining area of the transmission 1, are separated from the electrical machine 14 and the torsional vibration damper 35, which are arranged in the dry segment of the transmission 1, using a simple housing design and only little sealing measures in relation to the remaining components arranged in the dry segment of the transmission 1.

Of course, in another advantageous embodiment of the transmission, at the discretion of the person skilled in the art, the first shift element 12 and the second shift element 13 can be positioned in reverse sequence as a function of the respective application deviating from the arrangement illustrated in FIG. 2, i.e., to position the second shift element 13 in the axial direction of the gear input shaft 2 on the side of the torsional vibration damper 35 that faces away from the electrical machine 14 between the electrical machine 14 and the first shift element 12.

Figure 3:
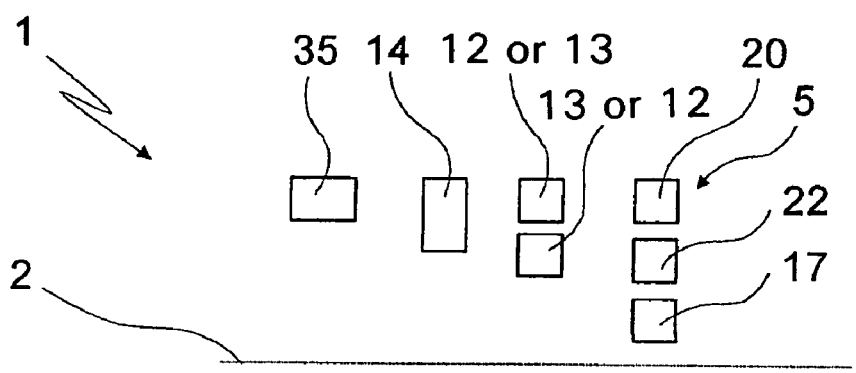
FIG. 3 is the area X in an illustration corresponding to FIG. 2, wherein a first shift element and a second shift element are disposed radially inside each other and are positioned between the electrical machine and the first planetary gearset.

FIG. 3 illustrates a second embodiment of a transmission 1 according to the invention as an alternative to the embodiment shown in FIG. 2. In this second embodiment, the first shift element 12 and the second shift element 13 are also arranged between the electrical machine 14 and the first planetary gearset 5, as in the first embodiment illustrated in FIG. 1 and FIG. 2. The two shift elements 12 and 13, however, are disposed coaxially to each other and the second shift element is positioned radially between the first shift element 12 and the gear input shaft 2. Deviating from this, it is also conceivable to reverse the arrangement of the first shift element 12 in relation to the second shift element 13 as a function of the respectively present application so that the first shift element 12 is positioned radially between the second shift element 13 and the gear input shaft 2.

The embodiment of the transmission 1, shown in FIG. 3, requires less installation space than the embodiments of the transmission 1, shown in FIG. 1 and FIG. 2, since the first shift element 12 and the second shift element 13 are not arranged adjacent to each other, but are nested inside each other between the electrical machine 14 and the first planetary gearset 5 in the radial direction of the transmission 1.

Figure 4:
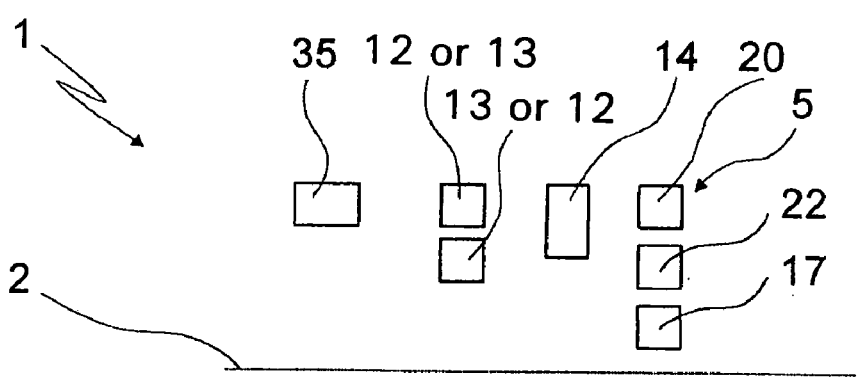
FIG. 4 is an illustration of area X from FIG. 1 corresponding to FIG. 3, wherein the two shift elements arranged radially inside each other are disposed on a side of the electrical machine that faces the gear input.

FIG. 4 shows the area X of a third embodiment of the transmission 1 in which the first shift element 12 is disposed coaxially to the second shift element 13 and radially between the second shift element 13 and the gear input shaft 2. Moreover, the two shift elements 12 and 13 are positioned on the side of the electrical machine 14 that faces the torsional vibration damper 35 between the machine and the torsional vibration damper 35. This configuration of the two shift elements 12 and 13 lends itself in particular when the two shift elements 12 and 13 are configured as dry clutches since these can then be disposed easily together with the torsional vibration damper 35 and the electrical machine 14 in the dry segment of the transmission 1 and can be separated from the wet segment of the transmission 1 using a simple housing design and little sealing efforts.

Additionally, just as the second embodiment of the transmission 1, illustrated in FIG. 3, the embodiment of the transmission 1, illustrated in FIG. 4, requires less installation space in the axial direction of the gear input shaft 2 compared to the embodiments of the transmission 1, shown in FIG. 1 and FIG. 2, because the two shift elements 12 and 13 are nested radially inside each other.

Of course, it is also possible in the embodiment from FIG. 4 to position the second shift element 13 radially between the first shift element 12 and the gear input shaft 2 if the first shift element 12 must be configured with greater transmission capabilities than the second shift element 13 as a function of the respective application. This is due to the fact that with identical axial length the shift element, which radially encloses the other shift element, typically has greater transmission capabilities than the shift element located on the inside due to the larger outer diameter.

Figure 5:
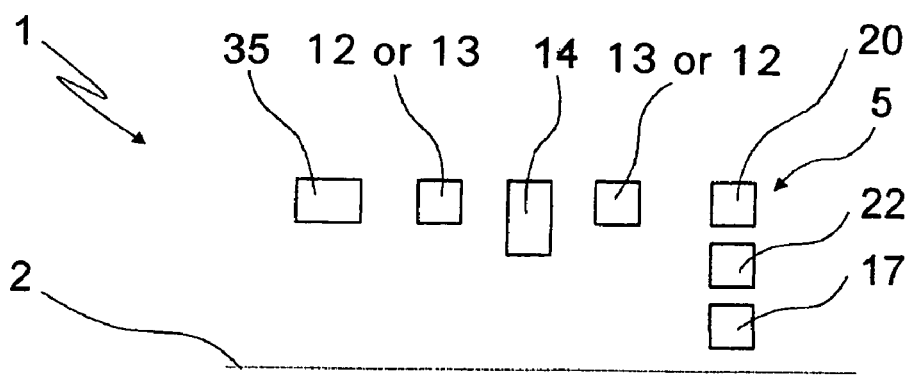
FIG. 5 a schematic illustration of the area X from FIG. 1 in another embodiment of the transmission according to the invention, in which one each of the two shift elements is disposed on the side that faces the gear input and on the side of the electrical machine that faces away from the gear input.

The area X of a fourth embodiment of a transmission, according to the invention, is illustrated in FIG. 5. In this case, one of the two shift elements 12 or 13 is positioned both in the axial direction of the gear input shaft 2 between the torsional vibration damper 35 and the electrical machine 14 and between the electrical machine 14 and the first planetary gearset 5. This arrangement of the transmission 1 is advantageous, for example, when one of the two shift elements 12 or 13 is configured as a dry clutch and the other shift element 13 or 12 as a wet clutch. This way, the separation plane between the dry segment of the transmission 1 and the wet segment of the transmission 1 in the area between the electrical machine 14 and the shift element 13 or 12 configured as a wet clutch can also be implemented easily.

Figure 6:
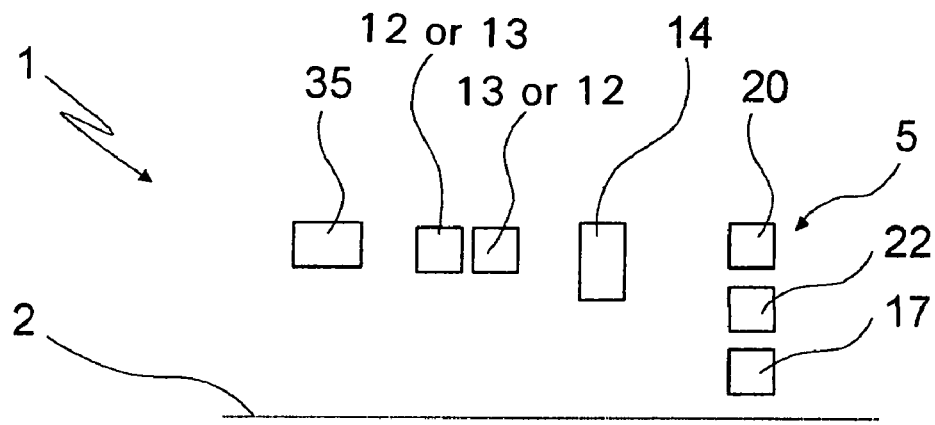
FIG. 6 is the area X of the additional example of a transmission from FIG. 1, in which the two shift elements are disposed on the side of the electrical machine that is associated with the gear input.

FIG. 6 shows the area X of a fifth embodiment of a transmission 1, according to the invention, in which the two shift elements 12 and 13 are disposed between the torsional vibration damper 35 and the electrical machine 14 as in the example from FIG. 4. Deviating from the example from FIG. 4, the two shift elements 12 and 13 are disposed adjacent to each other in the axial direction of the gear input shaft 2 so that the transmission 1 from FIG. 6 has a greater installation space requirement in the axial direction that the example from FIG. 4. On the other hand, in the embodiment of the transmission 1 from FIG. 6, the two shift elements 12 and 13 can be designed to have the same outer diameter so that both shift elements 12, 13 can offer similar transmission capabilities.

Figure 7:
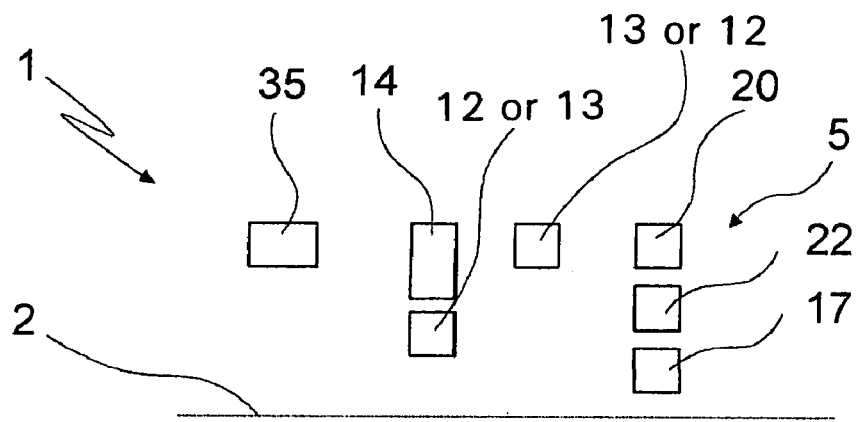
FIG. 7 the area X marked in FIG. 1 of another embodiment of a transmission according to the invention, in which one of the shift elements is disposed on the side of the gear input that faces away from the electrical machine and the second shift element is positioned coaxially to the electrical machine and radially between the electrical machine and the gear input shaft, and FIG. 8 a schematic illustration of the area X of an alternative embodiment to the transmission illustrated in FIG. 7, in which the first shift element is disposed on the side that faces the gear input and the second shift element is positioned coaxially to the electrical machine and radially between the electrical machine and the gear input shaft.
Figure 8:
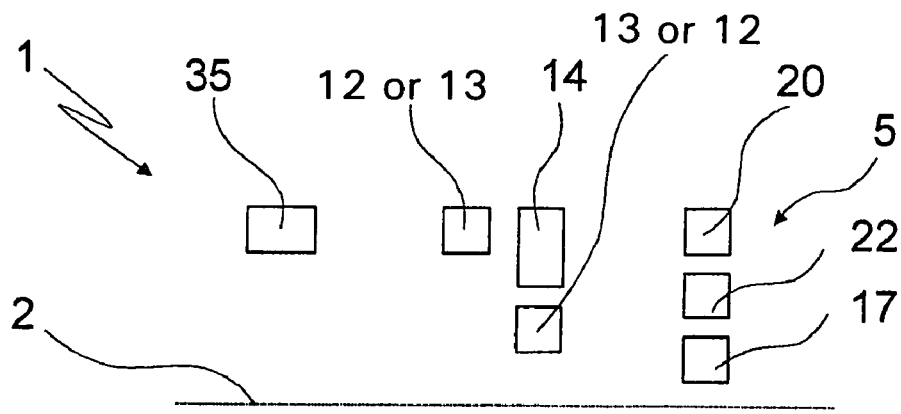

In the embodiments illustrated in FIG. 7 and FIG. 8, one of the shift elements 12 or 13 is disposed coaxially to the electrical machine 14 and between the electrical machine 14 and the gear input shaft 2. The other shift element 13 or 12 is positioned in the axial direction of the gear input shaft 2 adjacent to the electrical machine 14, wherein in the embodiment from FIG. 7, the shift element 13 or 12 is disposed between the electrical machine 14 and the first planetary gearset 5 and, in the seventh embodiment of the transmission 1 from FIG. 8, it is disposed between the torsional vibration damper 35 and the electrical machine 14.

These two embodiments also lends themselves, for example, when the available installation space in the motor vehicle in the axial direction of the transmission 1 is limited and significantly more torque must be transmitted via one of the two shift elements 12 or 13 than via the other shift element 13 or 12 so that the shift element 12 or 13 requiring greater transmission capabilities is disposed adjacent to the electrical machine 14 in the axial direction and the shift element 13 or 12 requiring lower transmission capabilities is positioned inside the electrical machine 14 with a smaller diameter.

REFERENCE NUMERALS 1 transmission
2 gear input shaft
3 gear output shaft
5 first planetary gearset
6 second planetary gearset
7, 8, 9, 10, 11 shift element
12 first shift element
13 second shift element
14 electrical machine
17 sun gear
18 sun gear shaft
19 shift element
20 ring gear
21 ring gear shaft
22 planet carrier
23 planet carrier
24 first sun gear
25 second sun gear
26 first sun gear shaft
27 second sun gear shaft
28 first planet gear
29 second planet gear
30 first planet carrier
31 second planet carrier
32 intermediate shaft
33 ring gear
34 housing
35 torsional vibration damper
36 engine output shaft

The invention claimed is:

1. A transmission (1) comprising a gear input shaft (2), a gear output shaft (3), several shift elements (7, 8, 9, 10, 11, 12, 13, 19), at least one planetary gearset (5) and an electrical machine (14), a required gear ratio being adjustable as a function of activation of the shift elements (7 to 13, 19) and the electrical machine (14), and the electrical machine (14) being linkable to a first shaft (21) of the first planetary gearset (5) by means of a first shift element (12) and to a second shaft (18) of the first planetary gearset (5) by means of a second shift element (13), at least the first shift element (12) or the second shift element (13) is disposed in an axial direction of the gear input shaft (2) adjacent to the electrical machine (14).

2. The transmission according to claim 1, wherein in relation to the gear input the first shift element (12)is positioned in the axial direction of the gear input shaft (2) between one of the gear input and the electrical machine (14) or between the electrical machine (14) and the first planetary gearset (5), the second shift element (13) is disposed coaxially to the electrical machine (14) and radially between the electrical machine (14) and the gear input shaft (2).

3. The transmission according to claim 1, wherein both the first shift element (12) and the second shift element (13) are disposed in the axial direction of the gear input shaft (2) adjacent to the electrical machine (14).

4. The transmission according to claim 3, wherein in relation to the gear input, the first shift element (12) and the second shift element (13) are disposed in the axial direction of the gear input shaft (2) between the gear input and the electrical machine (14).

5. The transmission according to claim 3, wherein in relation to the gear input, the first shift element (12) and the second shift element (13) are disposed in the axial direction of the gear input shaft (2) between the electrical machine (14) and the first planetary gearset (5).

6. The transmission according to claim 3, wherein the first shift element (12) is disposed in the axial direction of the gear input shaft (2) between the gear input and the electrical machine (14) and the second shift element (13) is positioned between the electrical machine (14) and the first planetary gearset (5).

7. The transmission according to claim 3, wherein the first shift element (12) and the second shift element (13) are disposed in the axial direction of the gear input shaft (2) adjacent to each other.

8. The transmission according to claim 3, wherein the first shift element (12) is disposed coaxially to the second shift element (13) and is positioned radially between the gear input shaft (2) and the second shift element (13).

9. The transmission according to claim 3, wherein the second shift element (13) is positioned coaxially to the first shift element (12) and is disposed radially between the gear input shaft (2) and the first shift element (12).

10. The transmission according to claim 1, wherein at least one second planetary gearset (6) is provided, which is preferably configured as a Ravigneaux-type planetary gearset.

* * * * *